United States Patent [19]

Fenton et al.

[11] 4,125,470
[45] Nov. 14, 1978

[54] BAND-PLY LUBRICANT CONCENTRATES

[75] Inventors: William N. Fenton, Freeland; Joseph W. Keil, Midland, both of Mich.

[73] Assignee: Dow Corning Corporation, Midland, Mich.

[21] Appl. No.: 672,932

[22] Filed: Apr. 2, 1976

[51] Int. Cl.$^2$ ............................................... C10M 1/12
[52] U.S. Cl. ..................................... 252/27; 252/49.6
[58] Field of Search ................................ 252/27, 49.6

[56] References Cited

U.S. PATENT DOCUMENTS 3,234,252  2/1966  Pater ............................. 252/49.6 X
3,967,968  7/1976  Stone et al. ...................... 252/27 X Primary Examiner—Paul F. Shaver
Attorney, Agent, or Firm—Jack E. Moermond

[57] ABSTRACT

Band-ply lubricant concentrates are disclosed which are useful in the preparation of both solvent and water based formulations. Unexpected advantages of greater formulation latitude and product stability have been found. The concentrates consist of (A) an alkylene oxide polymer, (B) unique siloxane copolymer dispersing agents, (C) a polydimethylsiloxane fluid, and in some instances (D) mica or talc.

16 Claims, No Drawings

BAND-PLY LUBRICANT CONCENTRATES

Band-ply lubricants, or "inside tire paints" as they are some times called, are well known in the tire industry. See, for example, U.S. Pat. Nos. 3,532,624; 3,713,851 and 3,905,823. The use of preformulated band-ply lubricants, such as those described in the foregoing patents, is wide-spread throughout the tire industry. However, there were two significant objections to these products. First, the preformulated products stability leave something to be desired. That is, the various components of the composition tend to separate, particularly upon storage for a period of time. Secondly, the products, not being formulated to meet the specific requirements for each tire manufacturer, do not always give optimum performance.

It is an object of this invention to provide a band-ply lubricant concentrate which will allow tire manufacturers to formulate band-ply lubricants which meet the individual manufacturers needs and performance standards.

Another object of this invention is to provide a band-ply lubricant concentrate which will not present stability problems during periods of storage.

An obvious advantage of a band-ply lubricant concentrate is that water or solvent need not be shipped as with the preformulated products which results in substantial savings. Also, less storage space is required for the concentrate package than for a fully formulated product. The advantages of individualized formulation latitude have already been alluded to above.

One unexpected advantage that flows from the instant invention is the shelf stability of products formulated from the concentrates of this invention. It is believed that this stability is due at least in part to the unique siloxane copolymer dispersing agents employed in the concentrates.

More specifically, the present invention relates to a composition consisting of (A) about 39 to 75 percent by weight of an alkylene oxide polymer having a molecular weight of at least 500 and in which the alkylene oxide units are selected from the group consisting of ethylene oxide units and propylene oxide units, (B) about 1 to 15 percent by weight of a siloxane copolymer selected from the group consisting of (1) copolymers consisting essentially of $SiO_2$ units, $(CH_3)_3SiO_{1/2}$ units $D(CH_3)_2SiO_{1/2}$ in which D is a polyoxyethylene polymer having a molecular weight of at least 2000, or a polyoxyethylene-polyoxypropylene copolymer having a molecular weight of at least 2500 and the polyoxypropylene portion constitutes up to 50 mole percent of the organic portion of the copolymer, said D being attached to the silicon atom via a silicon-carbon bond, the ratio of the $SiO_2$ units to the total $(CH_3)_3SiO_{1/2}$ and $D(CH_3)_2SiO_{1/2}$ units being in the range of 1:0.4 to 1:1.2, (2) copolymers which are reaction products derived from heating a mixture of a siloxane consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxyethylene polymer having a molecular weight of at least 2000 or a hydroxylated polyoxyethylene-polyoxypropylene copolymer having a molecular weight of at least 2500 and the polyoxypropylene constitutes up to 50 mole percent of the organic portion of the copolymer, (3) polydimethylsiloxane-organic copolymers in which the polydimethylsiloxane portion has a molecular weight of at least 2000 and the organic portion consists essentially of a polyoxyethylene polymer having a molecular weight of at least 800, or a polyoxyethylene-polyoxypropylene copolymer having a molecular weight of at least 1500 and the polyoxypropylene constitutes up to 50 mole percent of the organic portion of the copolymer said organic portion being attached to silicon atoms via silicon-carbon bonds, and (4) polydimethylsiloxane-organic copolymers which are reaction products produced by heating a mixture of hydroxylated polydimethylsiloxanes having a molecular weight of at least 1500, and a hydroxylated polyoxyethylene polymer having a molecular weight of at least 800, or a hydroxylated polyoxyethylene-polyoxypropylene copolymer having a molecular weight of at least 1500 and the polyoxypropylene constitutes up to 50 mole percent of the organic portion of the copolymer, and (C) about 21 to 55 percent by weight of a polydimethylsiloxane fluid having a viscosity in the range of 100 to 250,000 centistrokes at 25° C.

The present invention further relates to a composition consisting of (A) about 16.5 to 65 percent by weight of an alkylene oxide polymer having a molecular weight of at least 500 and in which the alkylene oxide units are selected from the group consisting of ethylene oxide units and propylene oxide units, (B) about 1 to 12 percent by weight of a siloxane copolymer selected from the group consisting of (1) copolymers consisting essentially of $SiO_2$ units, $(CH_3)_3SiO_{1/2}$ units and $D(CH_3)_2SiO_{1/2}$ in which D is a polyoxyethylene polymer having a molecular weight of at least 2000, or a polyoxyethylene-polyoxypropylene copolymer having a molecular weight of at least 2500 and the polyoxypropylene portion constitutes up to 50 mole percent of the organic portion of the copolymer, said D being attached to the silicon atom via a silicon-carbon bond, the ratio of the $SiO_2$ units to the total $(CH_3)_3SiO_{1/2}$ and $D(CH_3)_2SiO_{1/2}$ units being in the range of 1:0.4 to 1:1.2, (2) copolymers which are reaction products derived from heating a mixture of a siloxane consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxyethylene polymer having a molecular weight of at least 2000 or a hydroxylated polyoxyethylene-polyoxypropylene copolymer having a molecular weight of at least 2500 and the polyoxypropylene constitutes up to 50 mole percent of the organic portion of the copolymer, (3) polydimethylsiloxane-organic copolymers in which the polydimethylsiloxane portion has a molecular weight of at least 2000 and the organic portion consists essentially of a polyoxyethylene polymer having a molecular weight of at least 800, or a polyoxyethylene-polyoxypropylene copolymer having a molecular weight of at least 1500 and the polyoxypropylene constitutes up to 50 mole percent of the organic portion of the copolymer said organic portion being attached to silicon atoms via silicon-carbon bonds, and (4) polydimethylsiloxane-organic copolymers which are reaction products produced by heating a mixture of hydroxylated polydimethylsiloxanes having a molecular weight of at least 1500, and a hydroxylated polyoxyethylene polymer having a molecular weight of at least 800, or a hydroxylated polyoxyethylene-polyoxypropylene copolymer having a molecular weight of at least 1500 and the polyoxypropylene constitutes up to 50 mole percent of the organic portion of the copolymer, and (C) about 10.5 to 44 percent by weight of a polydimethylsiloxane fluid having a viscosity in the range of 100 to 250,000 centistrokes at 25° C., and (D) about 11 to 65.5 percent by weight of a material selected from the group consisting of mica and talc.

In the above compositions component (A) is an alkylene oxide polymer having a molecular weight of at least 500 and in which the alkylene oxide units are ethylene oxide units, propylene oxide units, or combinations thereof. Such materials are well known to those skilled in the art by a variety of names including polyalkylene glycols and polyoxyalkylene ethers. It is believed that a molecular weight of at least 500 is necessary to obtain good lubrication in the final formulations. While there is no known upper limit to the molecular weight of the alkylene oxide polymer to be employed, those alkylene oxide polymers having molecular weights of less than 5000 are commonly employed.

Component (B) of the compositions of this invention is a siloxane copolymer dispersing agent. One silicone dispersing agent useful herein is a siloxane copolymer consisting essentially of $SiO_2$ units, $(CH_3)_3SiO_{1/2}$ units and $D(CH_3)_2SiO_{1/2}$ units in which D is a polyoxyethylene polymer having a molecular weight of at least 2000 or a polyoxyethylene-polyoxypropylene copolymer having a molecular weight of at least 2500 and the polyoxypropylene portion constitutes up to 50 mole percent of the copolymer said D being attached to the silicon atom via a silicon-carbon bond, and the ratio of the $SiO_2$ units to the total $(CH_3)_3SiO_{1/2}$ and $D(CH_3)_2SiO_{1/2}$ units is in the range of 1:0.4 to 1:1.2.

A second silicone dispersing agent useful herein is a siloxane copolymer reaction product derived from heating a mixture of a siloxane consisting essentially of $SiO_2$ units and $(CH_3)_3SiO_{1/2}$ units in which the ratio of the $SiO_2$ units to $(CH_3)_3SiO_{1/2}$ units is in the range of 1:0.4 to 1:1.2, and a hydroxylated polyoxyethylene polymer having a molecular weight of at least 2000 or a hydroxylated polyoxyethylene-polyoxypropylene copolymer having a molecular weight of at least 2500 and the polyoxypropylene portion constitutes up to 50 mole percent of the copolymer. It is believed that these dispersing agents differ from those described immediately above only in that the polyoxyethylene portion is attached to the silicon atom via a silicon to oxygen to carbon bond instead of a direct silicon to carbon bond. It is theorized that the reaction upon heating takes place between residual silanol known to exist in the siloxane and the hydroxyl groups in the polyoxyalkylene. Formation of the reaction product is facilitated by the use of a catalyst known to promote the silanol-carbinol condensation reaction, examples of such catalysts being based such as potassium hydroxide and metal salts such as stannous octoate.

The third silicone dispersing agent useful in this invention is a polydimethylsiloxane-organic copolymer in which the polydimethylsiloxane portion has a molecular weight of at least 2000 and the organic portion consists essentially of a polyoxyethylene polymer having a molecular weight of at least 800 or a polyoxyethylene-polyoxypropylene copolymer having a molecular weight of at least 1500 and the polyoxypropylene portion constitutes no more than 50 mole percent of the organic portion of the copolymer, said organic portion being attached to silicon atoms via silicon-carbon bonds.

The fourth silicone dispersing agent useful herein is a siloxane-organic copolymer which is the reaction product produced by heating a mixture of a hydroxylated polydimethylsiloxane having a molecular weight of at least 1500 and a hydroxylated polyoxyethylene having a molecular weight of at least 800 or a hydroxylated polyoxyethylene-polyoxypropylene copolymer having a molecular weight of at least 1500 and the polyoxypropylene constitutes up to 50 mole percent of the organic portion of the copolymer.

Component (C) of the above compositions is a polydimethylsiloxane fluid having a viscosity in the range of 100 to 250,000 centistokes at 25° C. These fluids are well known articles of commerce. Generally speaking, a polydimethylsiloxane fluid having a viscosity in the range of 300 to 125,000 centistrokes is preferred.

Component (D) of the above compositions is mica or talc, or a combination of the two materials. These materials are believed to function primarily as lubrication aids and fillers in the final formulated products.

In addition to the above components small amounts of other additives such as rust inhibitors (about 0.01 to 0.2 percent), thickening agents (about 0.01 to 0.5 percent) or bactericides (about 0.02 to 0.4 percent) can be incorporated into the concentrates of this invention. Alternatively, these or other additives can be incorporated by the tire manufacturer at the time he uses the concentrate to prepare a fully formulated band-ply lubricant.

Now in order that those skilled in the art may better understand how the present invention can be practiced, the following examples are given by way of illustration and not by way of limitation.

All parts and percents referred to herein are by weight and all viscosities measured at 25° C. unless otherwise specified.

EXAMPLE 1

A composition was prepared which consisted of (A) about 50.5 percent of a polyoxyethylene-polyoxypropylene random copolymer having a molecular weight of about 2600 (Dow Chemical Polyglycol P15/200), (B) about 4.5 percent of a siloxane copolymer which was the reaction product derived from heating 1 part of a siloxane consisting essentially of $SiO_2$ units and $(CH_3)_3SiO_{1/2}$ units in which the ratio of $SiO_2$ units to $(CH_3)_3SiO_{1/2}$ units was in the range of 1:0.4 to 1:1.2, and 3 parts of a hydroxylated polyoxyethylene-polyoxypropylene copolymer having a molecular weight of about 6200 and about a 1:1 mole ratio of ethylene oxide units to propylene oxide units, in 4 parts of xylene employing a stannous octoate catalyst, and (C) about 23.7 percent of a polydimethylsiloxane fluid having a viscosity of about 100,000 cs. plus about 21.3 percent of a polydimethylsiloxane fluid having a viscosity of about 350 cs.

EXAMPLE 2

A band-ply lubricant was prepared which consisted essentially of about 13.3% of the concentrate of Example 1, 0.4% of carboxymethyl cellulose (CMC-7H), 1% of soya lecithin (thickening agent), 0.1% sodium nitrite (rust inhibitor), 42.75% water, 0.175% the sodium salt of pentachlorophenol (Dowicide G), 0.175% of a mixture of 75% 1-(3-chloroallyl)5,7-triaza-1-azonia-adamantane chloride and 25% sodium bicarbonate (Dowicil 75), 32.1% mica (325 mesh), 10% talc and 0.1% of an alkyl phenoxy polyoxyethylene ethanol (Makon 10). This band-ply lubricant is designed for use where high air bleed is required.

EXAMPLE 3

A band-ply lubricant was prepared which consisted essentially of about 21% of the concentrate of Example 1, 3.3% of a polyoxyethylene-polyoxypropylene random copolymer having a molecular weight of 2600 (Dow Chemical Polyglycol P15/200), 0.25% carboxymethyl cellulose (CMC-7M), 0.75% soya lecithin, 41.9% water, 0.175% of the sodium salt of pentachlorophenol, 0.175% of a mixture of 75% 1-(3-chloroallyl)5,7-triaza-1-azoniaadamantane chloride and 25% sodium bicarbonate, 0.1% sodium nitrite, and 32.35% mica (325 mesh). This band-ply lubricant is designed for use where low viscosity and high slip are required.

For purpose of comparison a band-ply lubricant similar to the one above was prepared which consisted essentially of 13.9% of a polyoxyethylene-polyoxypropylene random copolymer having a molecular weight of 2600 (Dow Chemical Polyglycol P15/200), 0.05% of carboxymethyl cellulose (CMC-7M), 0.75% soya lecithin, 25% water, 0.175% of the sodium salt of pentachlorophenol, 0.175% of a mixture of 75% 1-(3-chloroallyl)5,7-triaza-1-azoniaadamantane chloride and 25% sodium bicarbonate, 0.1% sodium nitrite, 32.55% mica (325 mesh), 14.2% of a 35% aqueous emulsion of a 100,000 cs. polydimethylsiloxane fluid, and 12.8% of a 35% aqueous emulsion of a 350 cs. polydimethylsiloxane fluid.

To test the stability of the above prepared band-ply lubricants they were placed in a Waring Blender and subjected to agitation at the "Hi-Speed" setting for various lengths of time after which samples were drawn and set aside for stability evaluation.

The band-ply lubricant prepared above for comparison showed oiling upon standing less than 1 hour after 3 minutes of agitation; showed about 5% oiling on the top immediately after 5 minutes of agitation; and showed substantial oiling and separation immediately after 8 minutes of agitation. After standing for 3 days the 3, 5 and 8 minute agitation samples all had about a 5% oil layer, about a 30% water layer, and exhibited complete mica separation or settling.

The band-ply lubricant of the instant invention prepared above showed no oiling or settling immediately after 3, 5 or 8 minutes of agitation. After standing for 3 days the 3, 5 and 8 minute agitation samples had about a 10% water layer on top but showed on signs of oiling or mica separation or settling.

EXAMPLE 4

A concentrate was prepared which consisted essentially of (A) about 55.05% of a polyoxypropylene-polyoxyethylene random copolymer having a molecular weight of about 2600 (Dow Chemical Polyglycol P15/200), (B) about 7.49% of a siloxane copolymer reaction product identical to component (B) of Example 1, and (C) about 19.85% of a polydimethylsiloxane fluid having a viscosity of 100,000 cs. plus about 17.6% of a polydimethylsiloxane fluid having a viscosity of 350 cs.

A band-ply lubricant was prepared by blending, in the order indicated using a Waring Blender, 23.35% of the above prepared concentrate of this invention, 0.35% of carboxymethyl cellulose, 42.8% water, 0.75% soya lecithin, 0.175% of 1-(3-chloroallyl)5,7-triaza-1-azoniaadamantane chloride, 0.175% of the sodium salt of pentachlorophenol, 0.1% sodium nitrite and 32.3% mica. This formulation showed no oiling or separation after standing for 3 days. A sample of the formulation agitated for 3 minutes at "Hi-Speed" in the Waring Blender to check shear stability showed no oiling.

The above prepared band-ply lubricant was tested for lubricity using the Uniroyal Lubricity Tester. The above composition was compared to a control composition which had the same formulation as the comparative composition used in Example 3. The lubricity of both compositions of this test was equal.

EXAMPLE 5

To 30 g. of a polydimethylsiloxane fluid having a viscosity of 60,000 cs. there was added 3 g. of the siloxane reaction product (B) of Example 1 while stirring with a spatula. Then 67 g. of a polyoxyethylene-polyoxypropylene random copolymer having a molecular weight of about 2600 was added and mixed in with a propeller stirrer. Finally, the mixture was mixed in an Eppenbach mixer.

A second concentrate was prepared which was identical to the one above except that a polyoxyethylene-polyoxypropylene copolymer of the average formula $CH_2=CHCH_2(OC_2H_4)_{24}(OC_3H_6)_{24}OH$ was employed instead of the one specified above.

Both of the above concentrates were stable, having good particle size, and can be used in the preparation of either aqueous or solvent based band-ply lubricants.

EXAMPLE 6

Concentrates identical to that of Example 1 were prepared. These concentrates were subjected to various tests to evaluate stability. For example, *centrifuge stability* was tested by running for 60 minutes at 3000 rpm. *Shear stability* was tested by placing in a Waring Blender at hi-speed for 5 minutes. *Oven stability* was tested by placing samples in a 60° C. oven for 10 days. *Freeze-thaw stability* was tested by alternately freezing and thawing for 12 cycles. *Shelf stability* was tested by letting samples stand at room temperature for 10 weeks. In all of these tests, typical results were that the concentrates remained homogeneous and exhibited no separation or oiling.

The above concentrates can be diluted with and dispersed in water or organic solvents for use as band-ply lubricants, with or without additives as disclosed above. While upon standing the diluted products may separate over a period of time, they do remain permanently redispersible in contrast to the presently available band-ply lubricants not made in accordance with this invention.

EXAMPLE 7

When the ingredients specified below are used concentrates can be prepared when following the procedure of Example 5.

(I)

(A) 40% of an ethylene oxide polymer having a molecular weight of about 550.

(B) 10% of a siloxane copolymer consisting essentially of $SiO_2$ units, $(CH_3)_3SiO_{1/2}$ units and $D(CH_3)_2SiO_{1/2}$ units wherein D is a polyoxyethylene polymer having a molecular weight of about 2500, and the ratio of the $SiO_2$ units to the total $(CH_3)_3SiO_{1/2}$ and $D(CH_3)_2SiO_{1/2}$ units is about 1:0.8.

(C) 50% of a polydimethylsiloxane fluid having a viscosity of about 30,000 cs.

(II)

(A) 60% of a propylene oxide polymer having a molecular weight of about 1500.
(B) 5% of a polydimethylsiloxane-organic copolymer in which the polydimethylsiloxane portion has a molecular weight of about 3000 and wherein the organic portion is a polyoxyethylene-polyoxypropylene copolymer having a molecular weight of about 2200, about 45 mole percent of the units being polyoxypropylene, said organic portion being bonded to silicon atoms by silicon-carbon bonds.
(C) 35% of a polydimethylsiloxane fluid having a viscosity of about 100,000 cs.

(III)

(A) 75% of 50—50 mole percent ethylene oxide-propylene oxide copolymer having a molecular weight of about 1020.
(B) 5% of a polydimethylsiloxane-organic copolymer produced by heating a mixture of a hydroxylated polydimethylsiloxane having a molecular weight of about 1500 and a hydroxylated polyoxyethylene-polyoxypropylene copolymer having a molecular weight of about 4500, the polyoxypropylene being about 48 mole percent of the organic portion.
(C) 10% of a polydimethylsiloxane fluid having a viscosity of about 200,000 cs. plus 10% of a polydimethylsiloxane fluid having a viscosity of about 1000 cs.

(IV)

(A) 50% of a polyoxyethylene-polyoxypropylene copolymer having a molecular weight of about 2500.
(B) 3% of the siloxane copolymer reaction product (B) of Example 1.
(C) 14% of a polydimethylsiloxane fluid having a viscosity of about 100,000 cs. plus 13% of a polydimethylsiloxane fluid having a viscosity of about 350 cs.
(D) 20% of mica.

EXAMPLE 8

When 20 parts of concentrate (I), (II), or (III) or Example 7 are thoroughly mixed with 40 parts of water or VM&P naptha, 35 parts of mica, 10 parts of talc, 0.1 part rust inhibitor, 0.3 part thickening agent and 0.03 part of bactericide, compositions useful as band-ply lubricants are obtained.

When 55–60 parts of concentrate (IV) of Example 7 is mixed with 40–50 parts of water or solvent, compositions useful as band-ply lubricants are obtained. Thickening agents, rust inhibitors and bactericides may also be added to these compositions if so desired.

That which is claimed is:

1. A composition consisting of (A) about 39 to 75 percent by weight of an alkylene oxide polymer having a molecular weight of at least 500 and in which the alkylene oxide units are selected from the group consisting of ethylene oxide units and propylene oxide units, (B) about 1 to 15 percent by weight of a siloxane copolymer selected from the group consisting of
(1) copolymers consisting essentially of $SiO_2$ units, $(CH_3)_3SiO_{1/2}$ units and $D(CH_3)_2SiO_{1/2}$ in which D is a polyoxyethylene polymer having a molecular weight of at least 2000, or a polyoxyethylene-polyoxypropylene copolymer having a molecular weight of at least 2500 and the polyoxypropylene portion constitutes up to 50 mole percent of the organic portion of the copolymer, said D being attached to the silicon atom via a silicon-carbon bond, the ratio of the $SiO_2$ units to the total $(CH_3)_3SiO_{1/2}$ and $D(CH_3)_2SiO_{1/2}$ units being in the range of 1:0.4 to 1:1.2,
(2) copolymers which are reaction products derived from heating a mixture of a siloxane consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxyethylene polymer having a molecular weight of at least 2000 or a hydroxylated polyoxyethylene-polyoxypropylene copolymer having a molecular weight of at least 2500 and the polyoxypropylene constitutes up to 50 mole percent of the organic portion of the copolymer,
(3) polydimethylsiloxane-organic copolymers in which the polydimethylsiloxane portion has a molecular weight of at least 2000 and the organic portion consists essentially of a polyoxyethylene polymer having a molecular weight of at least 800, or a polyoxyethylene-polyoxypropylene copolymer having a molecular weight of at least 1500 and the polyoxypropylene constitutes up to 50 mole percent of the organic portion of the copolymer said organic portion being attached to silicon atoms via silicon-carbon bonds, and
(4) polydimethylsiloxane-organic copolymers which are reaction products produced by heating a mixture of hydroxylated polydimethylsiloxanes having a molecular weight of at least 1500, and a hydroxylated polyoxyethylene polymer having a molecular weight of at least 800, or a hydroxylated polyoxyethylene-polyoxypropylene copolymer having a molecular weight of at least 1500 and the polyoxypropylene constitutes up to 50 mole percent of the organic portion of the copolymer, and
(C) about 21 to 55 percent by weight of a polydimethylsiloxane fluid having a viscosity in the range of 100 to 250,000 centistokes at 25° C.

2. A composition as defined in claim 1 wherein
(A) has a molecular weight in the range of 500 to 5000,
(B) is siloxane copolymer (1), and
(C) has a viscosity in the range of 300 to 125,000.

3. A composition as defined in claim 1 wherein
(A) has a molecular weight in the range of 500 to 5000,
(B) is siloxane copolymer (2), and
(C) has a viscosity in the range of 300 to 125,000.

4. A composition as defined in claim 1 wherein
(A) has a molecular weight in the range of 500 to 5000,
(B) is siloxane copolymer (3), and
(C) has a viscosity in the range of 300 to 125,000.

5. A composition as defined in claim 1 wherein
(A) has a molecular weight in the range of 500 to 5000,
(B) is siloxane copolymer (4), and
(C) has a viscosity in the range of 300 to 125,000.

6. A composition as defined in claim 3 wherein
(A) is composed of ethylene oxide and propylene oxide units, and in
(B) the organic portion is a polyoxyethylene-polyoxypropylene copolymer.

7. A composition as defined in claim 6 wherein
(C) is a blend of polydimethylsiloxane fluids.

8. A composition as defined in claim 5 wherein (A) is composed of ethylene oxide and propylene oxide units, and in (B) the organic portion is a polyoxyethylene-polyoxypropylene copolymer.

9. A composition as defined in claim 8 wherein (C) is a blend of polydimethylsiloxane fluids.

10. A composition consisting of (A) about 16.5 to 65 percent by weight of an alkylene oxide polymer having a molecular weight of at least 500 and in which the alkylene oxide units are selected from the group consisting of ethylene oxide units and propylene oxide units, (B) about 1 to 12 percent by weight of a siloxane copolymer selected from the group consisting of (1) copolymers consisting essentially of $SiO_2$ units, $(CH_3)_3SiO_{1/2}$ units and $D(CH_3)_2SiO_{1/2}$ in which D is a polyoxyethylene polymer having a molecular weight of at least 2000, or a polyoxyethylene-polyoxypropylene copolymer having a molecular weight of at least 2500 and the polyoxypropylene portion constitutes up to 50 mole percent of the organic portion of the copolymer, said D being attached to the silicon atom via a silicon-carbon bond, the ratio of the $SiO_2$ units to the total $(CH_3)_3SiO_{1/2}$ and $D(CH_3)_2SiO_{1/2}$ units being in the range of 1:0.4 to 1:1.2, (2) copolymers which are reaction products derived from heating a mixture of a siloxane consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxyethylene polymer having a molecular weight of at least 2000 or a hydroxylated polyoxyethylene-polyoxypropylene copolymer having a molecular weight of at least 2500 and the polyoxypropylene constitutes up to 50 mole percent of the organic portion of the copolymer, (3) polydimethylsiloxane-organic copolymers in which the polydimethylsiloxane portion has a molecular weight of at least 2000 and the organic portion consists essentially of a polyoxyethylene polymer having a molecular weight of at least 800, or a polyoxyethylene-polyoxypropylene copolymer having a molecular weight of at least 1500 and the polyoxypropylene constitutes up to 50 mole percent of the organic portion of the copolymer said organic portion being attached to silicon atoms via silicon-carbon bonds, and (4) polydimethylsiloxane-organic copolymers which are reaction products produced by heating a mixture of hydroxylated polydimethylsiloxanes having a molecular weight of at least 1500, and a hydroxylated polyoxyethylene polymer having a molecular weight of at least 800, or a hydroxylated polyoxyethylene-polyoxypropylene copolymer having a molecular weight of at least 1500 and the polyoxypropylene constitutes up to 50 mole percent of the organic portion of the copolymer, and (C) about 10.5 to 44 percent by weight of a polydimethylsiloxane fluid having a viscosity in the range of 100 to 250,000 centistokes at 25° C., and (D) about 11 to 65.5 percent by weight of a material selected from the group consisting of mica and talc.

11. A composition as defined in claim 10 wherein (A) has a molecular weight in the range of 500 to 5000, (B) is siloxane copolymer (1), and (C) has a viscosity in the range of 300 to 125,000.

12. A composition as defined in claim 10 wherein (A) has a molecular weight in the range of 500 to 5000, (B) is siloxane copolymer (2), and (C) has a viscosity in the range of 300 to 125,000.

13. A composition as defined in claim 10 wherein (A) has a molecular weight in the range of 500 to 5000, (B) is siloxane copolymer (3), and (C) has a viscosity in the range of 500 to 125,000.

14. A composition as defined in claim 10 wherein (A) has a molecular weight in the range of 500 to 5000, (B) is siloxane copolymer (4), and (C) has a viscosity in the range of 300 to 125,000.

15. A composition as defined in claim 12 wherein (A) is composed of ethylene oxide and propylene oxide units, in (B) the organic portion is a polyoxyethylene-polyoxypropylene copolymer, (C) is a blend of polydimethylsiloxane fluids, and (D) is a combination of mica and talc.

16. A composition as defined in claim 14 wherein (A) is composed of ethylene oxide and propylene oxide units, in (B) the organic portion is a polyoxyethylene-polyoxypropylene copolymer, (C) is a blend of polydimethylsiloxane fluids, and (D) is a combination of mica and talc.

* * * * *